C. B. Bristol,
Snap Hook,
No. 47,764. Patented May 16, 1865.

Witnesses:
Jas. P. Bristol.
R. J. Fitzgerald.

Inventor:
Chas. B. Bristol

12# UNITED STATES PATENT OFFICE.

CHARLES B. BRISTOL, OF NEW HAVEN, CONNECTICUT, ASSIGNOR TO HIMSELF, WILLIAM W. HUGHES, WILLIAM H. ANDREWS, AND L. J. BRISTOL, OF SAME PLACE.

IMPROVED SNAP-HOOK.

Specification forming part of Letters Patent No. 47,764, dated May 16, 1865.

*To all whom it may concern:*

Be it known that I, CHARLES B. BRISTOL, of the city and county of New Haven, in the State of Connecticut, have invented a new and useful Improvement in Harness Hooks or Snaps; and I do hereby declare that the following is a full, clear, and exact description of the construction, character, and operation of the same, reference being had to the accompanying drawings, which make part of this specification, in which—

Figure 1:
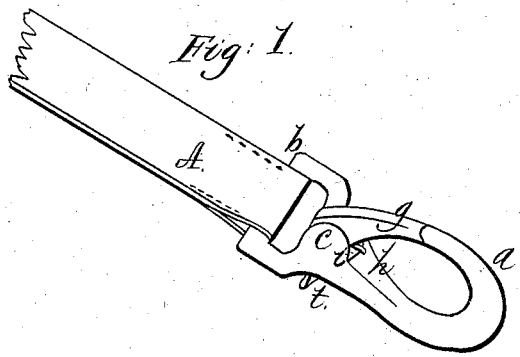
Figure 3:
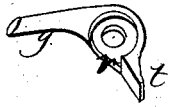
Figure 4:
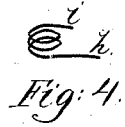
Figure 2:
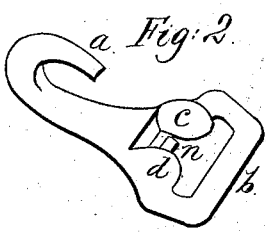

Figure 1 is a perspective view of the hook or snap, showing its loop attached to a strap, as ready for use. Fig. 2 is a perspective view of the hook and loop part, showing its shape when cast. Fig. 3 is a perspective view of the tongue part when ready to be put into its place. Fig. 4 is a perspective view of the spiral spring, showing its form.

I make the hook and loop part of the strap of malleable cast iron, or any suitable alloy, by casting it substantially in the shape or form shown in Fig. 2—that is, the hook $a$ in its permanent form, and the loop $b$ nearly in the shape it will be when finished, as shown in Fig. 1, with the two lips or ears which form the sides or walls of the recess which receives and holds the tongue $g$, Figs. 1 and 3, and the spiral spring, Fig. 4, and which is indicated $h$ and $i$, Fig. 1, and the projection or pin $n$, Fig. 2, which serves as a support for the spring and as a fulcrum or joint pin on which the tongue vibrates.

I make the tongue $g$, Figs. 3 and 1, by casting or making it substantially in the form shown in Fig. 3, with a hole to suit the fulcrum $n$, Fig. 2, and a recess, $r$, in which the spring, Fig. 4, rests and works to close the snap, and with or without a projection or trigger, as shown at $t$, Figs. 1 and 3, by which the tongue may be depressed to open the snap.

I make the spiral spring of elastic wire in the usual way, as shown in Fig. 4, with two ends, $h$ and $i$, projecting tangentially to serve as stops to cause the spring to operate or be operated on the involute and evolute or torsion principle, when the tongue is moved, as indicated at $h$ and $i$, Figs. 1 and 4.

Having made the parts as before described, I place the spiral spring, Fig. 4, on the projection or pin $n$, Fig. 2, and slip the tongue, Fig. 3, onto the projection or fulcrum-pin $n$, so that the spring, Fig. 4, will rest in and be inclosed by the recess $r$, with the two tangential parts $h$ and $i$ pointing toward the hook $a$. I then place the article in a proper vise or press and close up the cavity between $c$ and $d$ until the pin $n$ comes in contact with the side or ear $c$, Fig. 2, when the whole will appear as represented in Fig. 1, (except the strap A,) and will be ready for use or sale.

To use this hook or snap, I bear down the tongue $g$ in the usual way to open the hook, which will cause the involute torsion of the spring, and by releasing it the evolute operation of the spring will throw back the tongue to the position shown at $g$, Fig. 1; or, when the trigger is used, I apply my finger to the projection or trigger $t$, Figs. 1 and 3, and pull it back or toward the loop $b$, which, by the leverage, will depress the tongue $g$, and the effect will be the same as before.

What I claim as my invention, and desire to secure by Letters Patent, is—

1. The combination of the tongue $g$ with the spiral spring, Fig. 4, when the spring works on the torsion principle and rests in a recess, as $r$, in the rear end of the tongue, substantially as herein described.

2. The combination of the fulcrum-pin $n$ with the tongue $g$, when the pin $n$ is cast in one of the ears, and the recess or cavity is fitted to be closed, substantially as herein described.

CHAS. B. BRISTOL.

Witnesses:
 JAS. P. BRISTOL,
 R. FITZGERALD.